(12) United States Patent
House et al.

(10) Patent No.: US 10,046,264 B2
(45) Date of Patent: Aug. 14, 2018

(54) NON-EXTRUDED ACTIVATED CARBON HONEYCOMB STRUCTURES

(71) Applicant: Corning Incorporated, Corning, NY (US)

(72) Inventors: Keith Leonard House, Corning, NY (US); Benedict Yorke Johnson, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 196 days.

(21) Appl. No.: 14/870,992

(22) Filed: Sep. 30, 2015

(65) Prior Publication Data

US 2016/0096137 A1    Apr. 7, 2016

Related U.S. Application Data

(60) Provisional application No. 62/060,123, filed on Oct. 6, 2014.

(51) Int. Cl.
*B01D 53/02* (2006.01)
*B01D 53/04* (2006.01)
(Continued)

(52) U.S. Cl.
CPC ............ *B01D 53/04* (2013.01); *B01D 53/02* (2013.01); *B01J 20/20* (2013.01); *B01J 20/28045* (2013.01); *B01J 20/3042* (2013.01); *B01J 20/3071* (2013.01); *B01J 20/3078* (2013.01); *B01J 20/3231* (2013.01);
(Continued)

(58) Field of Classification Search
CPC ...... B01D 2253/102; B01D 2253/3425; B01D 2257/102; B01D 2257/60; B01D 2257/7027; B01D 2257/708; B01D 53/02; B01D 53/04; B01J 20/20; B01J 20/28045; B01J 20/3042; B01J 20/3071; B01J 20/3078; B01J 20/3231; B01J 20/3234
See application file for complete search history.

(56) References Cited

U.S. PATENT DOCUMENTS

| 4,402,717 A | 9/1983 | Izumo et al. |
| 4,518,704 A * | 5/1985 | Okabayashi ............. B01J 20/20 156/89.25 |

(Continued)

FOREIGN PATENT DOCUMENTS

| CN | 101992001 | 3/2011 |
| CN | 102908860 | 2/2013 |

(Continued)

OTHER PUBLICATIONS

Database WPI XP002751713.
(Continued)

*Primary Examiner* — Christopher P Jones
(74) *Attorney, Agent, or Firm* — Shantanu Pathak

(57) ABSTRACT

A non-extruded filter article, including:
an activated carbon honeycomb substrate having a plurality of flow-through channels and porous walls, and the activated carbon substrate comprises a carbon in from 90 to 99.9 wt. % of the article, and the porous walls have a percentage porosity of from 40% to 65%. Also disclosed is a non-extrusion method of making the article and a method of using the article.

20 Claims, 2 Drawing Sheets

(51) Int. Cl.
*B01J 20/30* (2006.01)
*B01J 20/32* (2006.01)
*B01J 20/20* (2006.01)
*B01J 20/28* (2006.01)

(52) U.S. Cl.
CPC ..... *B01J 20/3234* (2013.01); *B01D 2253/102* (2013.01); *B01D 2253/3425* (2013.01); *B01D 2257/102* (2013.01); *B01D 2257/60* (2013.01); *B01D 2257/708* (2013.01); *B01D 2257/7027* (2013.01)

(56) References Cited

U.S. PATENT DOCUMENTS

| | | | |
|---|---|---|---|
| 4,992,319 A | | 2/1991 | Kurosawa et al. |
| 5,310,593 A | | 5/1994 | Tsujimoto et al. |
| 5,356,852 A | * | 10/1994 | DeLiso ............. B01J 20/20 428/116 |
| 5,403,548 A | * | 4/1995 | Aibe ............... E03D 9/052 422/5 |
| 5,510,063 A | | 4/1996 | Gadkaree et al. |
| 5,776,385 A | * | 7/1998 | Gadkaree ......... B01J 20/20 156/292 |
| 6,007,781 A | | 12/1999 | Campbell et al. |
| 6,413,303 B2 | | 7/2002 | Gelderland et al. |
| 7,666,507 B2 | | 2/2010 | Ishikawa et al. |
| 2001/0052224 A1 | | 12/2001 | Gelderland et al. |
| 2008/0236389 A1 | | 10/2008 | Leedy et al. |
| 2009/0178566 A1 | | 7/2009 | Tschantz et al. |
| 2010/0263533 A1 | | 10/2010 | Gadkaree et al. |
| 2012/0273410 A1 | | 11/2012 | Hofenauer et al. |
| 2013/0089687 A1 | * | 4/2013 | Tabata ............ B01J 20/0292 428/36.4 |
| 2015/0291446 A1 | * | 10/2015 | Addiego ........... B01J 20/02 210/679 |

FOREIGN PATENT DOCUMENTS

| | | |
|---|---|---|
| CN | 103394247 | 11/2013 |
| CN | 102284288 | 1/2014 |
| EP | 342598 | 11/1991 |
| EP | 1840264 | 10/2007 |
| EP | 1820554 | 4/2009 |
| GB | 2302826 | 2/1997 |
| JP | 2001321634 | 11/2001 |
| JP | 2002191682 | 7/2002 |
| JP | 2005209703 | 8/2005 |
| JP | 2008086870 | 4/2008 |
| JP | 2014136178 | 7/2014 |
| KR | 2006020791 | 3/2006 |
| KR | 601094 | 7/2006 |
| KR | 2009067951 | 6/2009 |

OTHER PUBLICATIONS

Database WPI XP002751714.
International Search Report, issued in connection with corresponding PCT application No. PCT/US2015/053923, dated Dec. 21, 2015.
M. Suzuki, Fundamentals and applications, Carbon, vol. 32, Issue 4, 1994, pp. 577-586—abstract.

* cited by examiner

NON-EXTRUDED ACTIVATED CARBON HONEYCOMB STRUCTURES

This application claims the benefit of priority under 35 U.S.C. § 119 of U.S. Provisional Application Ser. No. 62/060,123 filed on Oct. 6, 2014 the content of which is relied upon and incorporated herein by reference in its entirety.

CROSS-REFERENCE TO RELATED APPLICATIONS

The present application is related to commonly owned and assigned patent Application U.S. Ser. No. 62/060,236, filed concurrently herewith, entitled "HONEYCOMB FILTER ARTICLE AND METHODS THEREOF," but does not claim priority thereto.

The entire disclosure of any publications or patent documents mentioned herein are incorporated by reference.

BACKGROUND

The disclosure relates to a honeycomb filter article and to a method of making and using the article.

SUMMARY

In embodiments, the disclosure provides a simple and low-cost process for making a non-extruded, all-activated carbon honeycomb structure by high-temperature treatment of a carbonaceous material and an activating agent supported on corrugated organic paper.

BRIEF DESCRIPTION OF THE DRAWINGS

In embodiments of the disclosure.

DETAILED DESCRIPTION

Figure 1:
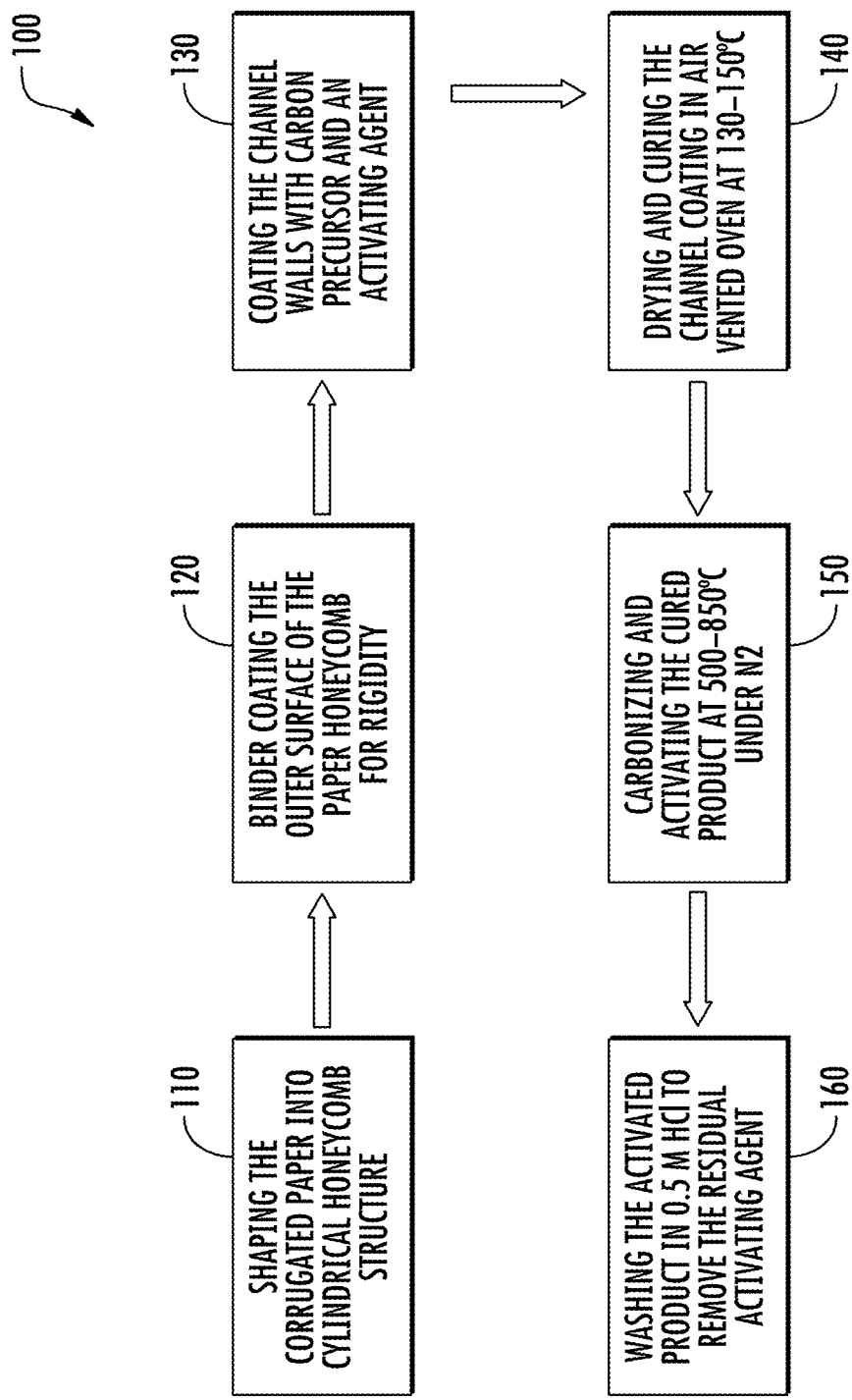
FIG. 1 is a process flow diagram showing the method of making the activated carbon honeycomb structure using corrugated paper as a honeycomb structure template.
Figure 2:
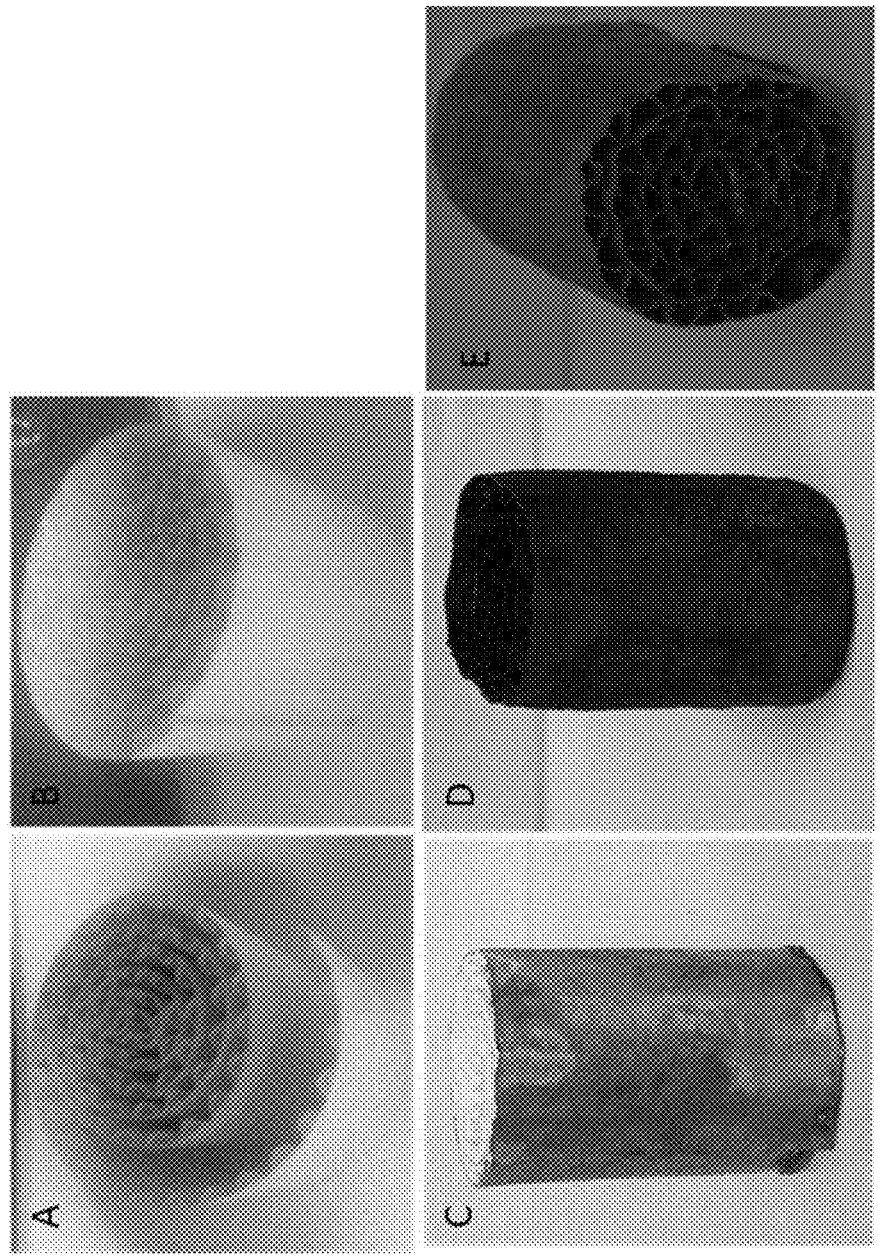
FIG. 2 shows images of: a non-inventive partially rolled corrugated paper (A); a corrugated paper formed into a honeycomb structure (B), for example, by winding or rolling; a paper honeycomb coated with cured phenolic resin coating on the outer or exterior surface to make it the body rigid (C); and all-activated carbon honeycombs prepared by high-temperature treatment of carbonaceous materials incorporated with an activating agent and supported on corrugated paper (D and E).

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Volatile organic compound," "VOC," "VOCs," or like terms refer to an organic chemical that has a high vapor pressure at ordinary room temperature. The VOC's high vapor pressure results from a low boiling point, which causes a large number of molecules to evaporate or sublimate from the liquid or solid form of the compound and enter the surrounding air. For example, formaldehyde, which evaporates from certain paint formulations, has a boiling point of −19° C. (−2° F.) and high vapor pressure of about 360 mm Hg at 25° C. and formalin (aqueous formaldehyde) has a boiling point which varies with its concentration and a Reid vapor pressure of 0.09 psia. VOCs are all compounds that appear in a gas chromatogram between and including n-hexane and n-hexadecane. Compounds appearing earlier are called very volatile organic compounds (VVOC) and compounds appearing later are called semi-volatile organic compounds (SVOC). The present disclosure contemplates an article and method of use that is active for capturing VOCs, and at least some VVOCs and SVOCs.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The articles and methods of the disclosure can include any value or any combination of the values, specific values, more specific values, and preferred values described herein, including explicit or implicit intermediate values and ranges.

In embodiments, the disclosure provides activated carbon-containing shaped bodies, such as honeycombs, that can be used, for example, as catalyst substrates, as sorbents, or as filters for the capture of particulate, liquid, or gaseous species from fluids, such as gas streams and liquid streams. Traditionally, activated carbon-containing shaped bodies were be manufactured by first combining carbon precursor materials, binder materials, and extrusion aids, which are then fused together, extruded into the desired shape, and then subjecting the unprocessed or "green body" to one or more heat treatments, and then subsequently subjecting the treated shaped body to one or more controlled oxidation firings. For example, a honeycomb body can be fabricated by extruding a carbon source such as a synthetic resin, and then firing to carbonize and activate the carbon. Although these traditional methods may be satisfactory, particularly in certain embodiments, it is sometimes too difficult to fabricate large honeycomb structures. In addition, the structures made by these methods are too expensive to be used in various fields. Furthermore, because of particle consolidation during extrusion, not all of the activated carbon provides an effective surface for adsorption.

To address the aforementioned drawbacks of the traditional methods, several technologies have been developed in the art that fabricate activated carbon honeycomb structures using low-cost corrugated paper to support activated carbon particles. Of those technologies, a common method is exemplified in U.S. Pat. No. 4,402,717, to Izumo, et al. entitled "An apparatus for removing moisture and odors from a gas stream," comprises a cylindrical honeycomb structure made from corrugated paper. The fabricated activated carbon paper filter comprises a porous inorganic fiber-based paper impregnated with carbon, with the carbon particles dispersed in the voids between the paper fibers, prior to the paper being corrugated and formed into a honeycomb structure. Such filters tend to have a limited carbon content and have a short service life. Other technologies have been specifically developed to address these limitations and to improve the operational effectiveness of paper-based activated carbon filters. A representative approach involves providing the carbon as coating on the surface of non-porous paper with the carbon coating confined and adhering to the paper surface using a binder (e.g., U.S. Pat. No. 6,413,303 and EP342598B1). Although these approaches may result in uniform carbon coatings of good activity and utility, the mass and volume based adsorptive capacity of the structure is still limited. That is, the activated carbon is present as only a surface coating and no adsorptive capacity is mentioned for the supporting paper. In addition, caution has to be exercised in selecting the binder so that the binder does not fill or prevent access to the activated carbon adsorption pore space. Furthermore, the use of the filters is limited to gas-phase adsorption due to instability of organic papers in liquid streams.

In embodiments, the disclosure provides a method for making a non-extruded, all-carbon honeycomb structure using corrugated paper as a honeycomb structure template. Unlike the methods of the prior art that use corrugated paper to support activated particles, the present disclosure uses the corrugated paper as template for forming the honeycomb structure. The corrugated paper is converted to carbon along with the carbon precursors during the high-temperature treatment of the coating materials supported on the paper. At the end of the process the product is a highly activated all-carbon honeycomb structure.

In embodiments, the disclosure provides a simple and low-cost process for fabricating a non-extruded, all-activated carbon honeycomb structure by high-temperature treatment of carbonaceous materials incorporated with an activating agent and supported on corrugated organic paper.

In embodiments, the disclosure provides a method of making the non-extruded, all-activated carbon honeycomb structure comprising: rolling up a commercially available corrugated porous organic paper, preferably from a commercially available source, into a cylindrical honeycomb structure; coating the outer surface of the preformed honeycomb structure with a thermoset polymer to fix the shape and provide rigidity for easy handling during the subsequent steps; dipping the now rigid body in a coating solution containing a carbon precursors and activating agent; drying and curing the coated body; heating the body at high temperature (e.g., from 500 to 850° C.) to convert the carbonaceous materials including the organic paper to carbon; and washing the product to remove the residual activating agent. The product obtained from the method is a highly activated, all-carbon honeycomb structure that can be used for a variety of adsorption processes including water and air purification, and gas storage.

In embodiments, the disclosed article and method are advantaged by, for example, one or more of the following:

Simplicity and Flexibility

In contrast to extrusion methods, the disclosed method provides simple fabrication such as roll forming, dip coating, and thermal treatment. The method also offers flexibility in fabricating activated carbon honeycomb (ACH) structures. ACH structures can be readily produced in large sizes that are difficult to produce with the extrusion technique partly due to die size creation limitations.

Accessibility of Pore Structure

Unlike the extrusion process, the disclosed method provides ACH structures having a high effective surface for adsorption due the absence of particle consolidation, which is an inherent problem with the extrusion process.

Cost

The biggest disadvantage of an extrusion process is the cost for machinery and machinery upkeep. The disclosed method has a low cost relative to the extrusion process. This stems in part from the simplicity of the process. In addition, compared to an extrusion batch, the coating mixture of the disclosed method is formulated with fewer raw materials (i.e., extrusion aids and pore formers, which are added to an extrusion batch are excluded from the disclosed method). Moreover, the corrugated paper and the carbon precursors such as cellulose powder and wheat flour are inexpensive and readily available commercially. Thus, the disclosed method of making provides a cost-effective replacement for current costly methods of fabricating all-ACH structures.

Environmental Safety

The extrusion method produces a large amount of process waste compared to the disclosed non-extrusion method of making an activated carbon honeycomb filter article. The extrusion method produces waste stream that includes, for example, rinse water, an ingredients of the extrusion batch, such as activated carbon, a binder resin, a pore former, and like ingredients. In contrast, the disclosed article and method of making produces little or no liquid or solid waste.

The present disclosure advantageously provides an expedient and low-cost method for making a fully activated carbon honeycomb structure using corrugated paper as the honeycomb structure template. The method of making is summarized in FIG. 1, and generally includes the steps described below.

In embodiments, the disclosure provides a filter article, comprising:

an activated carbon honeycomb substrate having a plurality of flow-through channels and porous walls, and the activated carbon substrate comprises a carbon in from 90 to 99.9 wt. % of the article, and the porous walls have a percentage porosity of from 40% to 65%.

In embodiments, the article can further comprise in combination with the activated carbon honeycomb substrate, at least one performance enhancing additive selected from, for example, a zero valent iron nanoparticle (ZVIN), activated alumina, a cerium oxide, or combinations thereof.

In embodiments, the carbon can be present in, for example, from 95 to 99.9 wt. % and the percentage porosity of the porous walls is from 43% to 60%.

In embodiments, the plurality of flow-through channels can have, for example, at least one of: a parallel relation, are in a monolith structure, are in a roll structure, or a combination thereof.

In embodiments, the plurality of flow-through channels have an end face geometry of at least one of: a "U" shape, an "S" shape, a sine wave shape, a square, a triangle, a hexagon, an ellipse, a rectangle, or combinations thereof.

In embodiments, the disclosure provides a method of making the aforementioned article, comprising:

contacting a shaped cellulosic substrate and an activating agent to form a treated substrate, wherein the shaped cellulosic substrate has porous walls and a plurality of flow-through channels;

heating the treated substrate to from 500° C. to 850° C. in an inert atmosphere to form the carbon substrate; and removing at least some of the activating agent from the carbon substrate to form the article.

In embodiments, the method can further comprise contacting the outer surface of the shaped cellulosic substrate with a binder (i.e., contacting the peripheral surface to impart rigidity to the shaped substrate) prior to heating the treated substrate.

In embodiments, the method can further comprise contacting the substrate with a carbon source material prior to heating the treated substrate.

In embodiments, the carbon source material is selected from at least one of: a phenolic resin, a cellulose powder, an activated carbon, a charcoal, a coal-based material, an organic char, or combinations thereof.

In embodiments, the method can further comprise contacting the treated substrate with a zero valent iron nanoparticle (ZVIN), a gamma-alumina, a ceria oxide, or combinations thereof.

In embodiments, the removing at least some of the activating agent removes from 90 wt. % to 99.9 wt. % of the activating agent.

In embodiments, the removing at least some of the activating agent can be accomplished, for example, by washing the carbon substrate with an acid, such aqueous HCl, or like acids.

In embodiments, the activating agent can be selected, for example, from at least one of an alkali metal, a transition metal salt, or combinations thereof.

In embodiments, the activating agent can be selected, for example, from at least one of KOH, NaOH, $K_2CO_3$, $ZnCl_2$, and combinations thereof.

In embodiments, the organic char material can be selected, for example, from at least one of: a wheat flour, a coconut shell, a pecan flour, a cherry pit flour, a rice hull, sawdust, or combinations thereof.

In embodiments, heating the treated substrate can be accomplished, for example, in from 2 to 10 hours.

In embodiments, the method can further comprise, for example, coating a thermoset polymer on the exterior of cellulosic substrate prior to contacting with a carbon source material or with an activating agent. In embodiments, the thermoset polymer can be selected from at least one of: a phenolic resin, an aromatic polyamide, a urea, a polyimide, a melamine resin, an epoxide, a carboxymethyl cellulose, or combinations thereof.

In embodiments, the cellulosic substrate can be, for example, from 90 to 99.9 vol % paper.

In embodiments, the disclosure provides a method of using the above mentioned article, comprising:

contacting the carbon honeycomb filter and a fluid having a contaminant.

In embodiments, the contacting of the carbon honeycomb filter and the fluid can include, for example, at least one of: flowing the fluid through the plurality of flow-through channels, moving the filter through the fluid, or a combination thereof, i.e., causing relative motion between the article and a fluid having a contaminant.

In embodiments, the fluid is a liquid, a gas, a suspension, a solution, or combinations thereof.

In embodiments, the contaminant can be selected, for example, from the group consisting of a heavy metal, a volatile organic compound, and combinations thereof.

In embodiments, the heavy metal can be, for example, at least one of: arsenic, cadmium, chromium, copper, selenium, lead, mercury, or combinations thereof, and the volatile organic compound is at least one of: benzene, formaldehyde, methylene chloride, perchloroethylene, or combinations thereof.

Referring to the Figures, FIG. 1 is a process flow diagram showing actual, alternative, or additional steps of the method of making (100) the activated carbon honeycomb structure using a corrugated paper as a starting point for honeycomb structure template. The method of making (100) can include, for example:

pre-forming the honeycomb structure by, for example, shaping a corrugated paper into a cylindrical honeycomb structure (110);

optionally coating the exterior surface of the pre-formed paper honeycomb structure with a suitable binder to impart greater rigidity (120) (In embodiments, an exterior coat and coating step may be unnecessary if, for example, the paper is already sufficiently rigid, when a less than rigid structure is desired; or where the paper is itself a curable material or includes a curable material such as a pre-coated paper or a synthetic paper having a cross-linkable molecular structure.);

coating the pre-formed paper honeycomb, separately or in combination, with a carbon source material or carbon precursor and an activating agent (130);

drying and curing the channel coat in an oven (140);

carbonizing and activating the carbonaceous materials (150); and acid washing and water rinsing (160).

The following provides a general procedure for preparing the disclosed non-extruded activated carbon honeycomb structure and filter article.

Step 1: Pre-Forming the Honeycomb Structure

The honeycomb structure can be formed, for example, by rolling up corrugated paper into a cylindrical shape. The corrugated paper, can be, for example, a porous corrugated packaging paper. A porous paper or similar material is selected to ensure a high yield of activated carbon in the finished filter article by filling the pores and covering the channel walls with a high loading of a carbon precursor material. After rolling up the paper to produce the desired paper roll diameter, the end of the paper roll can be taped with, for example, a cellophane tape, on the outer lateral wall of the roll. To fix the shape of the honeycomb and provide rigidity for ease of handling during the subsequent processing, the outer lateral surface of the paper roll honeycomb can be coated with, for example, a thermosetting material by, for example, painting, brushing, spraying, or like methods. Suitable thermosetting materials or thermoset polymers can include, for example, a phenolic resin, an aromatic polyamide, a urea, a polyimide, a melamine resin, an epoxide, a carboxymethyl cellulose (CMC), and like materials, or combination thereof. The coated paper honeycomb is then cured at, for example, 130 to 150° C., for example, from 30 min to 1 hour.

Step 2: Coating the Pre-Formed Paper Honeycomb with a Carbon Precursor and an Activated Agent The preformed paper honeycomb sample of Step 1 can be coated by, for example, dipping the sample in a mixture or solution containing a carbon precursor, an activating agent, or both. The carbon precursor material can include, for example, a phenolic resin, a cellulosic powder, an activated carbon, a charcoal, a coal-based material, a wheat flour, a coconut shell, pecan flour, a cherry pit flour, a rice hull, sawdust, and like materials. Many of these materials are commercially available. The chemical activating agent can be included in the coating solution with the carbon precursor material or the activating agent can be applied separately. The chemical activating agent ensures that that carbonization and activation of the carbon precursor material is achieved in a single step during the high temperature treatment. The activating agents can be, for example, an alkali metal, a transition metal, or a combination thereof, for example, KOH, NaOH, $K_2CO_3$, and $ZnCl_2$. An alternative to coating the paper honeycomb by a dipping process is a flow coating method where a slurry is sucked or blown through the channels of the honeycomb. After coating, the coated samples are dried and cured at, for example, of from 130 to 150° C. depending on the composition of the coating solution.

Step 3: Carbonizing and Activating the Carbonaceous Materials

High temperature heat treatment is accomplished to carbonize and activate the coated or loaded carbonaceous material including the supporting paper. Carbonization and activation can be achieved, if desired, in a single step by including the activating agent in the coating solution. The heat treatment can be performed, for example, at from 500 to 850° C. under inert atmosphere, such as nitrogen, for from 2 to 10 hours depending on the composition of the coating material. After the heat treatment, the ACH product is cooled to room temperature.

Step 4: Acid Washing and Rinsing in Water

The ACH product from the carbonization and activation is washed with aqueous 0.5M HCl for 40 min followed by repeated washing with deionized water until the pH is near neutral (i.e., about 7). The final step includes drying the product at 120° C. for 3 hours.

EXAMPLES

The following Examples demonstrate making, use, and analysis of the disclosed non-extruded activated carbon honeycomb structure, filter article, filter system, and methods of making in accordance with the above general procedures.

Example 1

A paper honeycomb sample (1" D×1.5" L) was prepared according the above procedure then dipped in a coating solution containing a microcrystalline cellulose powder (available from Sigma-Aldrich), activated carbon, and $ZnCl_2$. The coating solution was prepared as follows: 5 g $ZnCl_2$ was dissolved in 30 mL DI water. Then 4 g of cellulose powder was added to the solution and mixed well. Next, 5 g activated carbon powder (WPC from Calgon) was added to mixture and mixed well. The entire honeycomb sample was dipped in the mixture for 5 minutes. After clearing the channels by, for example, gravity or a compressed air stream, the sample was dried and cured at 140° C. for 1 hour in air-vented oven. Next, the cured sample was heated to 500° C. at 10° C./min under nitrogen environment and held for 3 hours. After cooling to room temperature, the carbon product was acid washed in 0.1 M HCl for 45 min to remove zinc. Finally, a neutral water wash was used to rinse the carbon product. Rinsing was carried out several times until the pH of the rinsed water was near neutral. The rinsed carbon product was then dried at 120° C. in air-vented oven to give the final activated carbon product. The ACH product was characterized by $N_2$ adsorption/desorption analysis at −196° C. using an adsorption analyzer. The sample was degassed for 12 hrs at 300° C. prior to the adsorption analysis. The surface, the total pore volume, and the average pore size were obtained from the adsorption isotherms. The filter coating formulations and resulting filter properties for the Examples 1 to 4 are tabulated in Table 1. The surface area properties and porosity properties suggest that the disclosed method is a viable approach for producing activated carbon honeycomb filter articles.

Example 2

A paper honeycomb sample (1" D×1.5" L) was prepared according the procedure of Example 1 with the exception that 5 g wheat flour was used in place of the cellulose powder, and 6 g activated carbon powder was used instead of 5 g activated carbon powder. The subsequent processing steps and characterization of the ACH product were the same as in Example 1.

Example 3

A paper honeycomb sample (1" D×1.5" L) was prepared according the procedure of Example 1 with the exception that 5 g of phenolic resin was used in place of the cellulose powder, and 7 g activated carbon powder was used instead of 5 g activated carbon powder. The subsequent processing steps and characterization of the ACH product were the same as Example 1.

Example 4

A paper honeycomb sample (1" D×1.5" L) prepared according the procedure of Example 1 with the exception that the coating solution contained phenolic resin, cellulose powder, and $ZnCl_2$. A first solution was prepared by mixing 5 g cellulose powder into 30 g phenolic resin. A second solution was prepared by mixing 15 g $ZnCl_2$ in 17 mL DI water. The two solutions were mixed together to form the coating solution and then dip coated. The subsequent processing steps and characterization of the ACH product were the same as Example 1.

Example 5

The adsorption capability of paper-based activated carbon honeycomb (PACH) substrate sample prepared by the disclosed method was demonstrated and compared to a Corning, Inc., extruded activated carbon honeycomb (EXACH) substrate sample (see U.S. Pat. No. 5,510,063 below). The respective substrate samples were first treated with zero valent iron nanoparticles (ZVIN) to form Sample 1 (PACH-ZVIN) and Sample 2 (EXACH-ZVIN) each having immobilized zero valent iron nanoparticles, and then tested for heavy metal removal. Table 3 shows the ZVIN loading on the two substrates. A higher ZVIN loading was achieved on the PACH substrate, which loading is attributed to its higher porosity. The adsorption tests were carried out in mixed metal ion solutions and the results are presented in Table 4. The PACH-ZVIN Sample 1 was as effective as the EXACH-ZVIN Sample 2 for removing heavy metals.

Example 6

The adsorption of volatiles organic compounds (VOCs), as exemplified by adsorption of benzene, was tested on a PACH (i.e., having no ZVIN) sample and the benzene uptake (mg/g) was compared to that of a EXACH (i.e., having no ZVIN) sample. In the tests, the samples were exposed for three hours to benzene vapor generated at 40° C. The benzene uptake was determined based on the difference in the mass of the sample before and after the benzene exposure. The results are presented in Table 4. The EXACH sample showed a slightly greater benzene uptake than the PACH sample, which uptake result may be attributed to the greater number of benzene adsorption sites in the EXACH sample as reflected by its relatively higher surface area.

Table 1 lists the properties of ACH samples prepared in the disclosed Examples. WPC is the designation for the activated carbon powder from Calgon Corporation having a BET surface area of 810 $m^2/g$.

TABLE 1

| Example | Coating formulation solutions | Weight of paper honey-comb (g) | Weight of carbon honey-comb obtained (g) | BET Surface area ($m^2/g$) | Porosity (%) |
|---|---|---|---|---|---|
| 1 | 5 g $ZnCl_2$<br>4 g cellulose powder<br>6 g activated carbon ("C")<br>30 mL DI water | 1.21 | 4.14 | 520 | 45 |
| 2 | 5 g $ZnCl_2$<br>5 g wheat flour<br>6 g activated carbon<br>30 mL DI water | 1.20 | 4.28 | 607 | 40 |
| 3 | 5 g $ZnCl_2$<br>5 g phenolic resin<br>7 g activated C<br>30 mL DI water | 1.18 | 5.59 | 460 | 27 |
| 4 | 5 g cellulose powder<br>15 g $ZnCl_2$<br>30 g phenolic resin<br>7 g activated C<br>17 mL DI water | 1.21 | 4.5 | 630 | 44 |

Table 2 lists the amount (g) of zero valent iron nanoparticles (ZVIN) immobilized on the disclosed paper-based activated carbon honeycomb Sample 1, and compared to ZVIN immobilized on a standard activated carbon honeycomb (i.e., extruded and activated by $CO_2$) Sample 2. Fabrication of the standard activated carbon honeycomb is disclosed in U.S. Pat. No. 5,510,063, to Gadkaree, et al, "Method of making activated carbon honeycombs having varying adsorption capacities." The method involves combining and extruding a carbon filler material (e.g., charcoal, coal, activated carbon), optionally a pore former, an extrusion aid, and a cross-linkable resin into a green body, and then curing and carbonizing the green body. After carbonization, the product is activated using, for example, $CO_2$ or steam (i.e., physical activation).

TABLE 2

| Sample ID | Sample Description | Bet SA ($mg^2/g$) | Porosity (%) | Initials Sample wt (g) | ZVIN Loading (g) |
|---|---|---|---|---|---|
| 1 PACH-ZVIN | Paper based activated carbon honeycomb having immobilized ZVI nanoparticles | 630 | 44 | 1.41 | 1.3 |
| 2 EXACH-ZVIN | Extruded activated carbon honeycomb having immobilized ZVI nanoparticles | 830 | 37 | 2.30 | 0.9 |

Table 3 lists the metal removal performance of Sample 1 PACH-ZVIN and comparative Sample 2 EXACH-ZVIN tested for 3 hours in a mixed metal solution by a batch approach.

TABLE 3

| | Initial metal Concentration (ppb) | Metal concentration after treatment (ppb) | |
|---|---|---|---|
| Metal | | Sample 1 PACH-ZVIN | Sample 2 EXACH-ZVIN |
| Arsenic | 32 | 8 | less than 5 |
| Cadmium | 27 | less than 5 | less than 5 |
| Chromium | 180 | 34 | 40 |
| Copper | 2650 | 330 | 190 |
| Selenium | 120 | less than 10 | 10 |
| Lead | 170 | less than 100 | less than 100 |
| Mercury | 51 | 12 | 10 |

Table 4 lists benzene uptake by a paper based activated carbon honeycomb Sample 1 (PACH) compared to that of an extruded activated carbon honeycomb Sample 2 (EXACH).

TABLE 4

| Sample | Sample Weight (g) | BET SA ($m^2/g$) | Exposure Temp. (° C.) | Exposure Time (hr) | Benzene Adsorbed (g) | Benzene Uptake (mg/g) |
|---|---|---|---|---|---|---|
| Sample 1 PACH | 1.75 | 730 | 40 | 3 | 0.61 | 358 |
| Sample 2 EXACH | 2.25 | 850 | | | 0.83 | 373 |

The disclosure has been described with reference to various specific embodiments and techniques. However, it should be understood that many variations and modifications are possible while remaining within the scope of the disclosure.

What is claimed is:

1. A non-extruded filter article, comprising an activated carbon honeycomb substrate having a plurality of flow-through channels and porous walls, wherein:
    the activated carbon honeycomb substrate comprises from 95 to 99.9 wt % of activated carbon, and
    the porous walls have a porosity ranging from 40% to 65%.
2. The article of claim 1, wherein the activated carbon honeycomb substrate further comprises at least one performance enhancing additive selected from a zero valent iron nanoparticle, activated alumina, a cerium oxide, or combinations thereof.

3. The article of claim 1, wherein the porosity of the porous walls ranges from 43% to 60%.

4. The article of claim 1, wherein the flow-through channels are in a parallel relation, are in a monolith structure, are in a roll structure, or combinations thereof.

5. The article of claim 1, wherein the flow-through channels have an end face geometry comprising a "U" shape, an "S" shape, a sine wave shape, a square, a triangle, a hexagon, an ellipse, a rectangle, or combinations thereof.

6. A method of making the article of claim 1, comprising: contacting a shaped cellulosic substrate and an activating agent to form a treated substrate, wherein the shaped cellulosic substrate has porous walls and a plurality of flow-through channels; heating the treated substrate to from 500.degree. C. to 850.degree. C. in an inert atmosphere to form the carbon substrate; and removing at least some of the activating agent from the carbon substrate to form the article.

7. The method of claim 6, further comprising contacting the outer surface of the shaped cellulosic substrate with a binder prior to heating the treated substrate.

8. The method of claim 6, further comprising contacting the substrate with a carbon source material prior to heating the treated substrate.

9. The method of claim 8, wherein the carbon source material is selected from at least one of: a phenolic resin, a cellulose powder, an activated carbon, a charcoal, a coal-based material, an organic char, or combinations thereof.

10. The method of claim 6, further comprising contacting the treated substrate with a zero valent iron nanoparticle, a gamma-alumina, a ceria oxide, or combinations thereof.

11. The method of claim 6, wherein removing at least some of the activating agent removes from 90 wt. % to 99.9 wt. % of the activating agent, and the cellulosic substrate is from 90 to 99.9 vol % paper.

12. The method of claim 6, wherein removing at least some of the activating agent is accomplished by washing the carbon substrate with an acid.

13. The method of claim 6, wherein the activating agent is selected from at least one of an alkali metal, a transition metal salt, or combinations thereof.

14. The method of claim 6, wherein the activating agent is selected from at least one of $KOH$, $NaOH$, $K_2CO_3$, $ZnCl_2$, and combinations thereof.

15. The method of claim 8, wherein the organic char material is selected from at least one of: a wheat flour, a coconut shell, a pecan flour, a cherry pit flour, a rice hull, sawdust, or combinations thereof.

16. The method of claim 6, wherein heating the treated substrate is accomplished in from 2 to 10 hours.

17. The method of claim 6, further comprising coating a thermoset polymer on the exterior of cellulosic substrate prior to contacting with a carbon source material or an activating agent, the thermoset polymer being selected from at least one of: a phenolic resin, an aromatic polyamide, a urea, a polyimide, a melamine resin, an epoxide, a carboxymethyl cellulose, or combinations thereof.

18. A method of using the article of claim 1, comprising: contacting the carbon honeycomb filter and a fluid having a contaminant.

19. The method of claim 18, wherein the fluid is a liquid, a gas, a suspension, a solution, or combinations thereof; the contaminant is selected from the group consisting of a heavy metal, a volatile organic compound, and combinations thereof.

20. The method of claim 19, wherein the heavy metal is at least one of: arsenic, cadmium, chromium, copper, selenium, lead, mercury, or combinations thereof, and the volatile organic compound is at least one of: benzene, formaldehyde, methylene chloride, perchloroethylene, or combinations thereof.

* * * * *